(12) United States Patent
Liu et al.

(10) Patent No.: US 11,122,670 B1
(45) Date of Patent: Sep. 14, 2021

(54) FLYING VEHICLE AUTOMATIC LIGHTING CONTROL SYSTEM AND METHOD

(71) Applicant: HONEYWELL INTERNATIONAL INC., Morris Plains, NJ (US)

(72) Inventors: Yang Liu, Shanghai (CN); Rui Tong, Shanghai (CN); Guo Qing Wang, Beijing (CN); Shuai Chen, Shanghai (CN); Jianhua Zhou, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/821,371

(22) Filed: Mar. 17, 2020

(51) Int. Cl.
  *B64F 1/18* (2006.01)
  *H05B 47/155* (2020.01)
  (Continued)

(52) U.S. Cl.
  CPC ........... *H05B 47/155* (2020.01); *B64C 19/00* (2013.01); *B64D 47/02* (2013.01); *H05B 47/11* (2020.01)

(58) Field of Classification Search
  CPC ...................... B64D 45/00; B64D 2045/0065; B64D 17/00; B64D 1/14; B64D 25/20; B64D 3/00; B64D 47/08; B64D 31/00; B64D 31/02; B64D 31/06; B64D 31/08; B64D 2045/0085; B64D 45/0015; B64D 47/00; B64D 47/02; B65H 2701/34; G06F 1/18; G06F 21/602; G06F 21/86; G06F 21/88; G07C 5/008; G07C 5/0858; G07C 5/085; B64C 39/024; B64C 2201/042; B64C 2201/146; G01C 23/00; G01C 21/00; G08G 5/0021; G08G 5/025; G08G 5/065; G08G 5/0013; G08G 5/0026; G08G 5/0034; G08G 5/0069; G09B 29/106; B60K 31/0058; B60L 3/0084; B60L 3/0092; B60L 3/04; B60W 10/08; B60W 2050/0043; B64F 5/60; F16H 61/12; H02P 6/00; G05D 1/0022; G05D 1/10; G05D 1/101; G06N 5/048; H04L 67/125
  USPC .... 340/956, 425.5, 468, 471, 438, 472, 332, 340/286.01, 531, 539.1, 436, 933, 475, 340/901–902, 463, 635
  See application file for complete search history.

(56) References Cited

U.S. PATENT DOCUMENTS 5,507,455 A * 4/1996 Yang ..................... A63H 30/04
                                                                244/190
6,252,525 B1    6/2001 Philiben
(Continued)

*Primary Examiner* — Daniel Previl
(74) *Attorney, Agent, or Firm* — Lorenz & Kopf, LLP

(57) ABSTRACT

A computing system for controlling a plurality of exterior lights on a flying vehicle is disclosed. The computing system is configured to: determine a flying vehicle status for the flying vehicle; determine an environment status for the flying vehicle; determine a current flight phase for the flying vehicle; determine, for each of a plurality of the exterior lights that is in an automatic lighting control mode, a desired lighting state for the exterior light by applying a predefined lighting pattern that identifies, based on the flying vehicle status, environmental status, and the current flight phase, a first subset of the exterior lights to cause to enter a first lighting state and a second subset of the exterior lights to cause to enter a second lighting state; and cause the first subset of exterior lights to be in the first lighting state and the second subset of exterior lights to be in the second lighting state.

20 Claims, 5 Drawing Sheets

(51) Int. Cl.
*B64C 19/00* (2006.01)
*B64D 47/02* (2006.01)
*H05B 47/11* (2020.01)

(56) References Cited

U.S. PATENT DOCUMENTS

| | | | |
|---|---|---|---|
| 7,202,613 B2 | 4/2007 | Morgan et al. | |
| 8,706,357 B1 * | 4/2014 | van den Heuvel | B64D 45/00 701/45 |
| 8,970,111 B2 * | 3/2015 | Everett | H05B 47/105 315/77 |
| 9,856,035 B1 * | 1/2018 | Keller | B64D 47/04 |
| 2005/0128751 A1 | 6/2005 | Roberge et al. | |
| 2008/0275642 A1 * | 11/2008 | Clark | G09B 29/106 701/457 |
| 2016/0257415 A1 * | 9/2016 | Ye | B64D 17/00 |
| 2017/0203855 A1 * | 7/2017 | Leclear | H05B 47/105 |
| 2017/0355470 A1 | 12/2017 | Keller et al. | |
| 2019/0220042 A1 * | 7/2019 | Guo | G08G 5/0013 |

* cited by examiner ions including enhancing the vision of the flight crew in manned flying vehicles, improving the ability of the flying vehicle to be recognized, and conveying information to the flight crew on other flying vehicle and to people on the ground, among other things. Types of exterior lights with which a flying vehicle may be equipped, may include, among others: (a) Navigation lights (e.g., a steady light near the leading edge of each wingtip wherein the starboard light may be green while the light on the port wing may be red); (b) Anti-Collision lights (e.g., flashing (or strobe) light assemblies installed on the upper and lower fuselage of a flying vehicle, which may be used to improve the visibility of the flying vehicle); (c) Strobe lights (e.g., high-intensity strobe lights that flash a white-colored light may be located on each wingtip, wherein these flashing lights can be very bright to attract attention during flight); (d) Taxi lights (e.g., a bright white lamp may be located on the nose landing gear strut of a plane, wherein this light may be typically turned on whenever the flying vehicle is in motion on the ground to provide the flight crew with greater visibility of the ground surrounding the flying vehicle during taxi, takeoff, and landing); (e) Landing lights (e.g., the brightest light(s) on the flying vehicle to provide the flight crew with enhanced visibility during the landing approach and that can be used to illuminate the runway at poorly lit airports); and (f) Wing lights (e.g., lights used to illuminate the leading edge of each wing to allow the flight crew to visually inspect the wings for icing conditions or to view engine actions).

FLYING VEHICLE AUTOMATIC LIGHTING CONTROL SYSTEM AND METHOD

TECHNICAL FIELD

Embodiments of the subject matter described herein relate generally to light control systems. More particularly, embodiments of the subject matter relate to light control systems on a flying vehicle.

BACKGROUND

Flying vehicles (e.g., airplane, helicopter, unmanned aerial vehicle (UAV), and urban air mobility (UAM) vehicle) are equipped with different types of exterior lights, which are used to provide illumination for flying vehicle operations including enhancing the vision of the flight crew in manned flying vehicles, improving the ability of the flying vehicle to be recognized, and conveying information to the flight crew on other flying vehicle and to people on the ground, among other things. Types of exterior lights with which a flying vehicle may be equipped, may include, among others: (a) Navigation lights (e.g., a steady light near the leading edge of each wingtip wherein the starboard light may be green while the light on the port wing may be red); (b) Anti-Collision lights (e.g., flashing (or strobe) light assemblies installed on the upper and lower fuselage of a flying vehicle, which may be used to improve the visibility of the flying vehicle); (c) Strobe lights (e.g., high-intensity strobe lights that flash a white-colored light may be located on each wingtip, wherein these flashing lights can be very bright to attract attention during flight); (d) Taxi lights (e.g., a bright white lamp may be located on the nose landing gear strut of a plane, wherein this light may be typically turned on whenever the flying vehicle is in motion on the ground to provide the flight crew with greater visibility of the ground surrounding the flying vehicle during taxi, takeoff, and landing); (e) Landing lights (e.g., the brightest light(s) on the flying vehicle to provide the flight crew with enhanced visibility during the landing approach and that can be used to illuminate the runway at poorly lit airports); and (f) Wing lights (e.g., lights used to illuminate the leading edge of each wing to allow the flight crew to visually inspect the wings for icing conditions or to view engine actions).

In manned flying vehicles, the onboard flight crew is tasked with manually switching various lights on or off depending on the flight phase, environment conditions, and whether abnormal or emergency conditions exist with the flying vehicle. This tasking can increase the flight crew's workload and distract their focus. Flight crew members may not properly switch various lights on or off at the proper time due to their workload, carelessness, or other conditions on the flying vehicle commanding their attention.

Hence, it is desirable to provide an automated system for controlling external lighting on a flying vehicle. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A computing system for controlling a plurality of exterior lights on a flying vehicle is disclosed. The computing system is configured to: determine whether a flying vehicle status for the flying vehicle is a normal status, an emergency status, or another abnormal status; determine an environment status for the flying vehicle including a plurality of the proximity of surrounding traffic, time of day (e.g., daytime, nighttime, morning, evening, midnight, relation to sunrise or sunset, etc.), visibility, and weather; determine a current flight phase for the flying vehicle; identify a plurality of exterior lights on the flying vehicle that are in an automatic lighting control mode; determine, for each of the plurality of exterior lights that are in the automatic lighting control mode, a desired lighting state for the exterior light by applying a predefined lighting pattern that identifies, based on the flying vehicle status, environmental status, and the current flight phase, a first subset of the exterior lights to cause to enter a first lighting state and a second subset of the exterior lights to cause to enter a second lighting state, wherein each of the first lighting state and the second lighting state is a different one of an on state, off state, strong intensity state, weak intensity state, or blinking state; and cause the first subset of exterior lights to be in the first lighting state and the second subset of exterior lights to be in the second lighting state.

A processor implemented method in a computing system in a flying vehicle for controlling a plurality of exterior lights on the flying vehicle is disclosed. The method includes: determining, by a processor, whether a flying vehicle status for the flying vehicle is a normal status, an emergency status, or another abnormal status; determining, by the processor, an environment status for the flying vehicle including a plurality of the proximity of surrounding traffic, time of day (e.g., daytime, nighttime, morning, evening, midnight, relation to sunrise, sunset, etc.), visibility, and weather; determining, by the processor, a current flight phase for the flying vehicle; identifying, by the processor, a plurality of exterior lights on the flying vehicle that are in an automatic lighting control mode; determining, by the processor for each of the plurality of exterior lights that are in the automatic lighting control mode, a desired lighting state for the exterior light by applying a predefined lighting pattern that identifies, based on the flying vehicle status, environmental status, and the current flight phase, a first subset of the exterior lights to cause to be in a first lighting state and a second subset of the exterior lights to cause to be in a second lighting state, wherein each of the first lighting state and the second lighting state is a different one of an on state, off state, strong intensity state, weak intensity state, or blinking state; and causing, by the processor, the first subset of exterior lights to be in the first lighting state and the second subset of exterior lights to be in the second lighting state.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
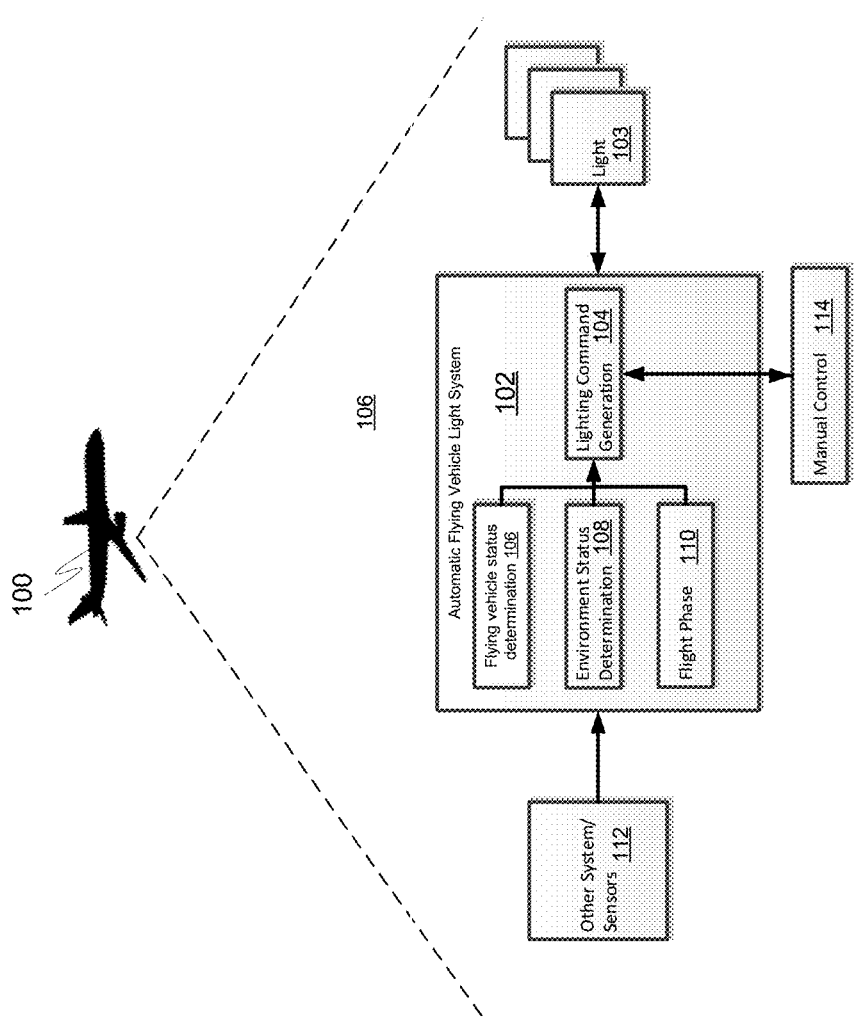
FIG. 1 is a block diagram depicting an example automatic flying vehicle light system on a flying vehicle, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for controlling the operation of a flying vehicle's exterior lighting system. Appropriate operation of a flying vehicle's lighting system can reduce the power consumption onboard a flying vehicle, reduce disturbances to nearby people/vehicles, provide a visual indication of a flying vehicle's emergency status, as well as reduce flight crew workload for manned flying vehicle.

The apparatus, systems, techniques and articles provided herein can automatically control exterior lighting on a flying vehicle based on data acquired by flying vehicle systems. The apparatus, systems, techniques and articles provided herein can allow for automatic control of exterior lights as well as allow for some manual control.

It may be desirable to equip an Unmanned Aerial Vehicle (UAV) with exterior lights. Exterior lighting on a UAV can make the UAV more visible to surrounding flying vehicle, nearby controllers, people/facility under the UAV's route, as well as provide a visual indication that the UAV has an emergency status. Exterior lighting can also enhance the visibility of visual equipment on UAVs, such as cameras, camcorders, etc. The apparatus, systems, techniques and articles provided herein can allow exterior lighting system to be applied to UAVs provide for controlling the operation of UAV's exterior lighting system.

FIG. 1 is a block diagram depicting an example automatic flying vehicle light system 102 on a flying vehicle 100. The example automatic flying vehicle light system 102 is configured to automatically control the status of various flying vehicle exterior lights 103 based on the flight phase, the flying vehicle status and the environmental status. The flying vehicle exterior lights 103 are the equipment that provide various illumination based on their location on the flying vehicle 100. The flying vehicle exterior lights 103 may be configured to provide feedback to the example automatic flying vehicle light system 102 regarding their status for confirming the operation of the exterior lights 103.

The example automatic flying vehicle light system 102 is configured to exercise automatic lighting control in normal and abnormal operation as well as responding to environment events. The example automatic flying vehicle light system 102 includes a lighting command generation module 104, a flying vehicle status determination module 106, an environment status determination module 108, and a flight phase determination module 110.

The example automatic flying vehicle light system 102 includes a controller that is configured to implement the lighting command generation module 104, flying vehicle status determination module 106, environment status determination module 108, and flight phase determination module 110. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example automatic flying vehicle light system 102 is configured to continuously perceive data from sensors and other system/equipment 112 and provide the data to the flying vehicle status determination module 106, environment status determination module 108, and flight phase determination module 110. The sensors and other system/equipment 112 include onboard/offboard systems/sensors that can provide data/information as input for automatic lighting control system 102. Examples may include, but are not limited to, flying vehicle sensors (e.g., air data sensors, inertial sensors, GPS and navigation radios) that provide flying vehicle state data such as altitude, airspeed, attitude, position, ground speed and the like; a Flight Management System (FMS), which provides flight plan data (e.g., planned take off runway and landing runway and the like); a landing gear system, which can provide a weight on wheel status; an engine system, which can provide an engine status and/or engine on fire indication; an ice detection system, which may provide for ice detection; and a wheel brake system, which can provide a parking brake status.

The flying vehicle status determination module 106 is configured to determine the flying vehicle status from perceived data from sensors and other system/equipment 112. The flying vehicle status may be a normal operation status, an emergency operation status (e.g., emergency landing, conflicting traffic detected, loss of communication), or some other abnormal status (e.g., vehicle controllability or navigation performance degraded, low fuel or low battery, electrical power system fault). The flying vehicle status determination module 106 could monitor the perceived data from sensors and other system/equipment 112 to determine, for example, the health of the engine, whether the engine is on fire, the health of the electrical power system, the battery status, the flying vehicle controllability, the navigation system status, the communication capability, and the like. The flying vehicle status determination module 106 could host internal logic to derive the flying vehicle status and/or obtain the flying vehicle status directly from other systems.

The environment status determination module 108 is configured to determine the environment status from perceived data from sensors and other system/equipment 112. The environment status may include, for example, the proximity of surrounding traffic, time of day (e.g., daytime, nighttime, morning, evening, midnight, relation to sunrise or sunset), visibility, weather, icing conditions, and the like. The environment status determination module 108 could host internal logic to derive the environment status and/or obtain the environment status directly from other systems.

The flight phase determination module 110 is configured to determine the flying vehicle flight phase for lighting operation from perceived data from sensors and other system/equipment 112. Different flying vehicle systems may have a different definition of the flight phase. For examples, a FMS may determine that a flying vehicle is in an approach flight phase when the flying vehicle sequences the initial approach waypoint to allow the FMS to activate the approach speed mode to decelerate the flying vehicle and assist the flight crew with configuring the flying vehicle for landing, whereas a Full Authority Digital Engine Control (FADEC) system may determine that the flying vehicle is in an approach flight phase when the flying vehicle is in a landing configuration to allow it to set the thrust to an approach idle to prepare for a go around maneuver. Consequently, the automatic flying vehicle light system 102 has defined specific flight phases and flight phase transitions in the flight phase determination module 110. The flight phase is defined to determine the lighting control goal for different flight sections for a complete flight, which could help the pilots/remote operators to better understand and expect the automatic behavior of the system in current flight phase; it could also help others like controllers, other pilots, or passengers of UAMs to better understand the vehicle's intention thru the lights.

An example listing of flight phases for automatic lighting control includes: preflight, taxi-out, takeoff, en-route, approach, landing, taxi in and flight complete. The flight phase determination module 110 is configured to determine the flight phase from perceived data from sensors and other system/equipment 112. For example, the engine on/off status, the weight on wheel signals, the parking brake status, ground speed, altitude, position, the flying vehicle configuration (e.g., flap, landing gear), the door open/close status, the flying vehicle flight plan data, the tuned ATC frequency and the like may be used to determine the flight phase.

Figure 2:
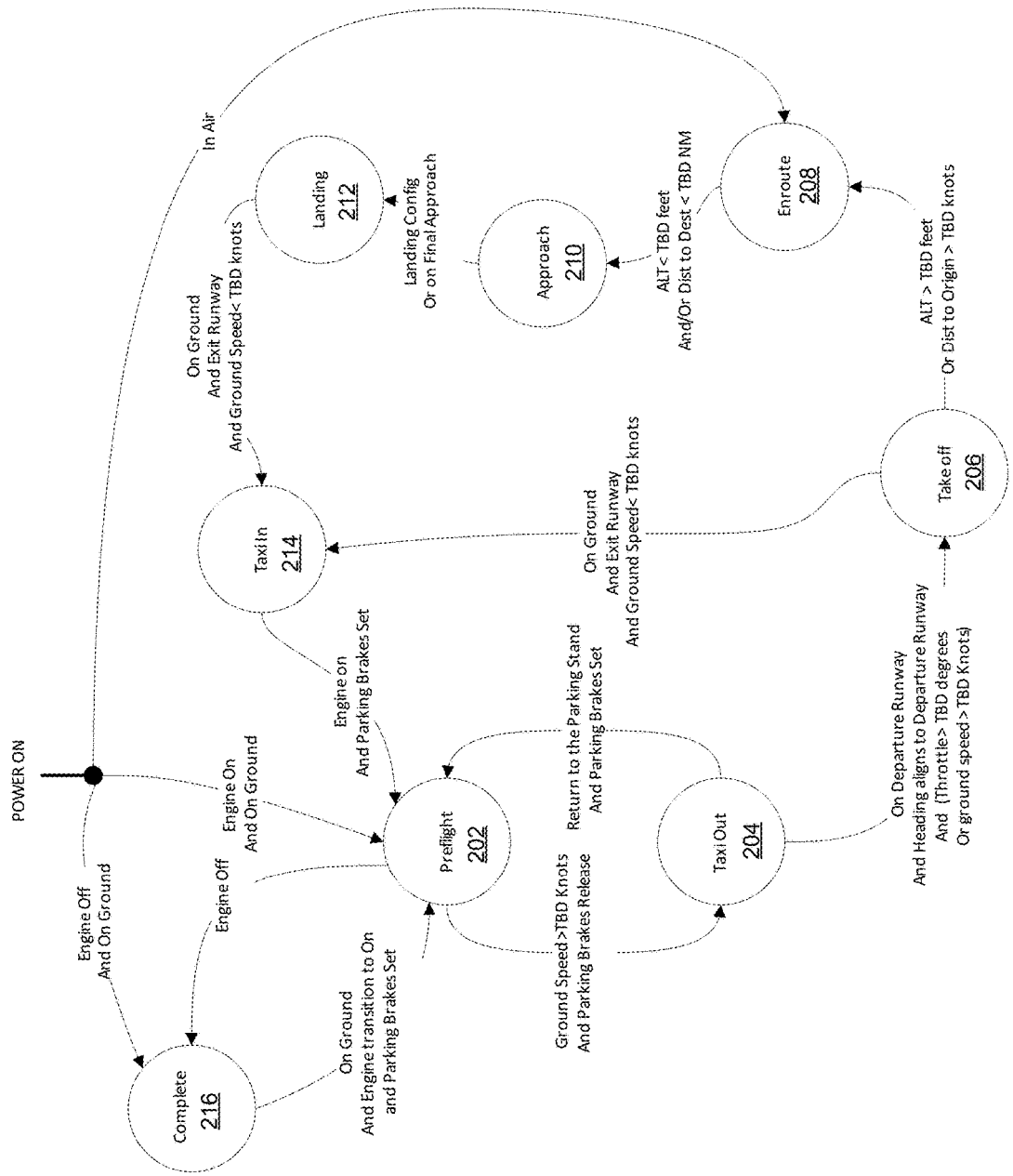
FIG. 2 is a state diagram depicting an example flight phase transition for a fixed wing flying vehicle that may be used by the flight phase determination module to determine the flying vehicle flight phase for lighting operation, in accordance with some embodiments.

FIG. 2 is a state diagram depicting an example flight phase transition for a fixed wing flying vehicle that may be used by the flight phase determination module 110 to determine the flying vehicle flight phase for lighting operation. Due to different flying vehicle configurations and flying vehicle features, for example for a vertical takeoff and landing (VTOL) vehicle, the flight phase criteria may vary and the flight phase may be determined using different methods and data.

In the depicted example, for a normal flight mission, the flight phase transitions, among others, include: a transition to a preflight flight phase 202 after the engine transitions to power on, the flying vehicle is on ground and the parking brakes are set; a flight phase transition from preflight 202 to taxi out 204, when the parking brakes are released and the flying vehicles is in motion on the taxi way; a flight phase transition from taxi out 204 to takeoff 206, when the flying vehicle is on the planned departure runway, lines up with the runway and/or the throttle lever or ground speed reaches a defined threshold (which indicates the flying vehicle initiates rolling); a flight phase transition from takeoff 206 to en-route 208, when the system monitors the flying vehicle is out of the boundary defined by altitude and/or distance from the origin; a flight phase transition from en-route 208 to approach 210, when the flying vehicle enters the boundary defined by altitude and/or distance to the destination; a flight phase transition from approach 210 to landing 212 when the flying vehicle is in landing configuration or the flying vehicle is on the final approach leg; a flight phase transition from landing 212 to taxi in 214, when the flying vehicle exits the runway (based on the flying vehicle position and a heading change) and the ground speed is slower than a defined threshold; a flight phase transition from taxi in 214 to preflight 202 when the parking brakes are set while engine is still on; and a flight phase transition from preflight 202 to complete 216 when the engines are off.

Referring back to FIG. 1, the lighting command generation module 104 is configured to retrieve flight phase information from the flight phase determination module 110, flying vehicle status information from the flying vehicle status determination module 106, and environment status information from the environment status determination module 108, and use the retrieved information to appropriately control the functioning of the lights. The lighting command generation module 104 is configured to generate automatic light control commands based on the flying vehicle status (e.g., normal, abnormal, or emergency), environment status and flight phase. In normal operation, lighting control criteria for generating the automatic light control command may be driven by operating regulations and/or airline rules and procedures. Table 1 provides an example listing of lighting commands for controlling exterior lights based on a normal flying vehicle status, current flying vehicle flight phase, and no environment status requiring modification to lighting commands.

TABLE 1

Example Relationship between Flight Phase and Exterior Lights

| Flight Phase | NAV | Beacon | Strobe | Taxi | Landing | Wing Inspection |
|---|---|---|---|---|---|---|
| Preflight | ON | ON | OFF | OFF | OFF | OFF |
| Taxi-out | ON | ON | ON | ON | OFF | OFF |
| Take off | ON | ON | ON | ON | ON | OFF |
| En-route | ON | ON | ON | OFF | OFF | OFF |
| Approach | ON | ON | ON | OFF | ON | OFF |
| Landing | ON | ON | ON | ON | ON | OFF |
| Taxi-in | ON | ON | ON | ON | OFF | OFF |
| Complete | OFF | OFF | OFF | OFF | OFF | OFF |

The environment status may change the lighting commands. Example criteria for modifying lighting control based on environment status include the following: (a) Improve flight crew's awareness of environment—for example, ice detected status could cause a lighting command change to turn on the wing inspection light to allow a flight crew member to visually check whether ice can be detected on the leading edge of a wing and determine whether to activate an anti-ice function; (b) Enhance flight operation safety—for example, environment status indication that indicates the flying vehicle is flying in a congested airspace could cause a lighting command change to turn on all feasible lights to improve the flying vehicle's visibility to other flying vehicle; and (c) Reduce consumption when feasible—for example, environment status indication that indicates the flying vehicle is descending in an airspace with no surrounding traffic may cause the landing/taxi lights to turn on later than normal (e.g., not until the final approach) to increase the life of the lights and/or to conserve energy usage.

When the flying vehicle is in an emergency status and the dedicated light/lights will be controlled per a predefined pattern as the emergency response. Note that detailed priority in a combination of emergency status may be defined based on the criticality of different emergency response.

The flying vehicle status may also change the lighting commands. Example criteria for modifying lighting control based on flying vehicle status include the following: (a) Maximize the airplane's identification for emergency—for example, an emergency landing or crash status should cause a lighting command change to turn on or cause the flashing of all feasible lights as the flying vehicle approaches the offsite landing site to maximize the ability of nearby vehicles and people on ground to avoid the flying vehicle and escape from its path; (b) Flying vehicle intention indication—for example, a loss of communication status on a flying vehicle may cause a lighting command change to cause certain lights to flash a predefined pattern to indicate a flying vehicle's intent to the nearby vehicles, ATC, ground station and the like; and (c) Prevent further damage—for example, an electrical power system fault status could result in a lighting command change to cause certain lights to switch off to prevent further damage or reduce power.

Figure 3:
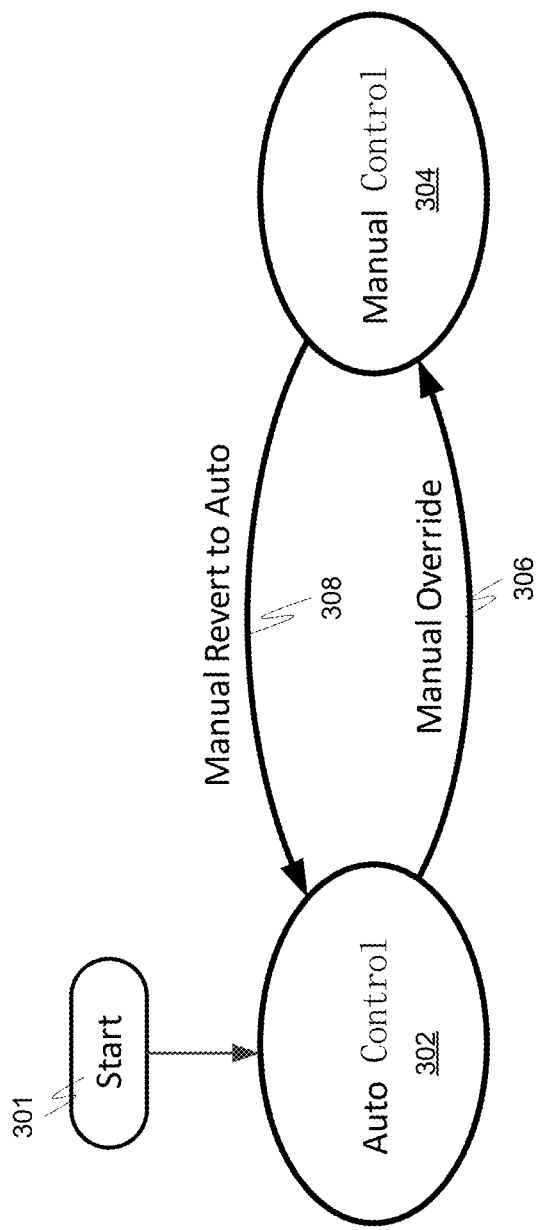
FIG. 3 is a state diagram depicting example control modes in an example automatic flying vehicle light system, in accordance with some embodiments.

FIG. 3 is a state diagram depicting example control modes in an example automatic flying vehicle light system. In this example, the example automatic flying vehicle light system includes two control modes, an automatic control mode 302 and a manual control mode 304. Different control modes are defined to determine how to generate, prioritize and change the control command for the light. In this example, the example automatic flying vehicle light system defaults to the Auto control mode 302 at start up 301 to generate automatic control command to the lights. The lighting command generation module 104 is also configured to allow for manual control of lights 103 when in the manual control mode 304. When the light control mode is Manual control 304, the lighting command generation module 104 is configured to generate a lighting command that corresponds to a manual command for the light(s) in the manual control mode. A manual override command 306 is required to change the control from the Auto control mode 302 to the manual control mode 304. Also, a manual revert to Auto command 308 is required to change the control from the manual control mode 304 back to the Auto control mode 302.

The example automatic flying vehicle light system can have different control modes for different lights. Certain lights may be controlled in a manual control mode 304 while other lights may be controlled in an Auto control mode 302.

A manual control module 114 is provided for use with the lighting command generation module 104 that allows for manual control of lights 103 on the flying vehicle, for example, by onboard flight crew members on manned flying vehicle and ground operators for unmanned flying vehicle. With the manual control module 114, the flight crew members (or remote pilots) are provided with the option to manually turn on/off dedicated light(s) by setting the dedicated light(s) in the manual control mode 304. When a flight crew member manually overrides an automatic lights command, the lighting command generation module 104 interprets the manual command as an intended activity to correct the automatic lighting command.

Figure 4:
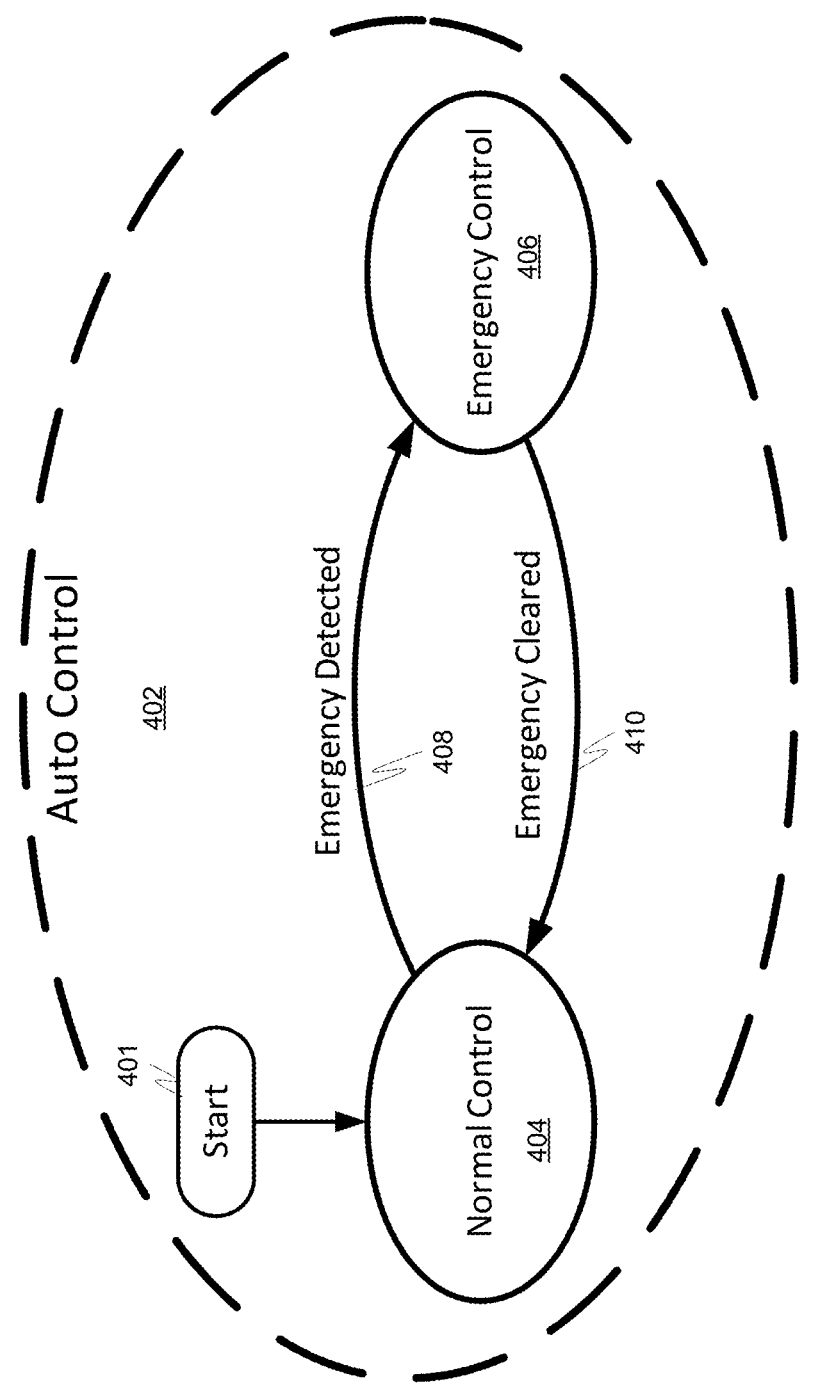
FIG. 4 is a state diagram depicting two example sub modes in an example automatic flying vehicle light system while in an auto control mode, in accordance with some embodiments.

FIG. 4 is a state diagram depicting two example sub modes in an example automatic flying vehicle light system while in an auto control mode 402. In this example, two sub modes are depicted, a normal control mode 404 and an emergency control mode 406. In other examples, other sub modes may be included such as an abnormal control mode that is not an emergency control mode. In this example, the normal control mode 404 is the default control mode at start up 401 and when there is no emergency event that requires dedicated light operation.

When in the normal control mode 404, the automatic flying vehicle light system 102 will generate an automatic light control command for the light(s) 103 based on the flight phase and the environment. As an example, the automatic light control command may be generated based on the flight phase transition as illustrated in Table 1. The environment status can take a higher priority and can cause a change in the automatic light control command. If an environment status is received, the automatic light control commands may change (for example, turn on the wing inspection lights when icing is detected; or turn off the strobe and anti-collision lights when flying thru a cloud).

In one example, when the light control mode is the normal control mode 404, the lighting command will be determined based on the flight phase and environment status according to $L=F(FP, ENV)$, in which L is the lighting command; FP is the indicator of flight phase; ENV is overall environment status which is the summary of pre-defined environment status (ENV1, ENV2, . . . ENVn), in which ENV represents 0 or 1 for individual condition like icing, daytime, etc.

When an emergency flying vehicle status 408 is detected, there is a state transition from the normal control mode 404 to the emergency control mode 406. When in the emergency control mode 406, the automatic flying vehicle light system 102 will generate automatic lighting commands based on a predefined lighting pattern. When an emergency clear flying vehicle status 410 is detected, there is a state transition from the emergency control mode 406 back to the normal control mode 404.

In one example, when the light control mode is the emergency control mode 406, the lighting command will be determined according to the predefined emergency lighting pattern: L=F(EMG), in which L is the lighting command; EMG is the overall flying vehicle status which is the summary of pre-defined emergency status (EMG1, EMG2, . . . EMGn), in which EMG represents 0 or 1 for individual emergency status like offsite landing, conflicting traffic, loss of communication, etc.

Figure 5:
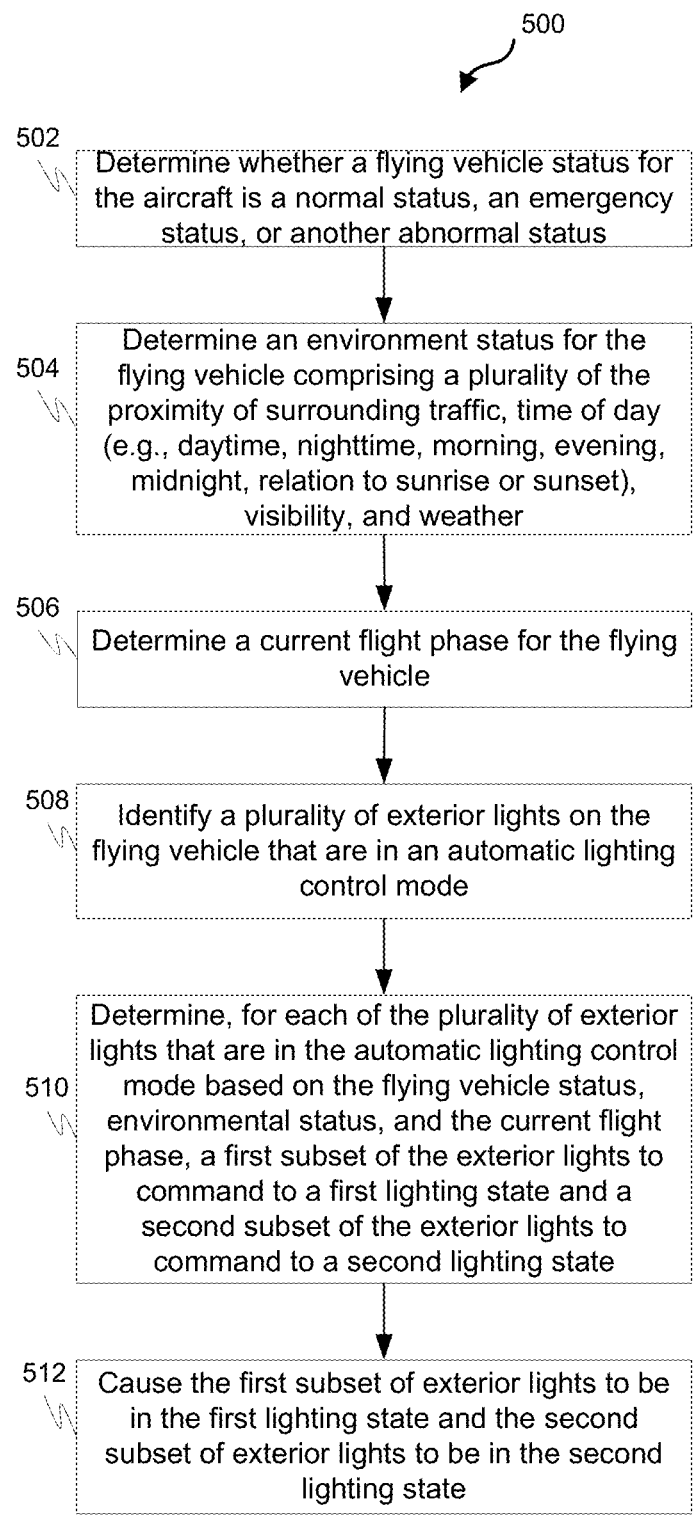
FIG. 5 is a process flow chart depicting an example process in in an example automatic flying vehicle light system, in accordance with some embodiments.

FIG. 5 is a process flow chart depicting an example process 500 in in an example automatic flying vehicle light system. The order of operation within the process 500 is not limited to the sequential execution as illustrated in the figure, but may be performed in one or more varying orders as applicable and in accordance with the present disclosure.

The example process 500 includes determining whether a flying vehicle status for the flying vehicle is a normal status, an emergency status, or another abnormal status (operation 502) and determining an environment status for the flying vehicle comprising a plurality of the proximity of surrounding traffic, time of day (e.g., daytime, nighttime, morning, evening, midnight, relation to sunrise or sunset), visibility, and weather (operation 504). The example process 500 includes determining a current flight phase for the flying vehicle (operation 506) and identifying a plurality of exterior lights on the flying vehicle that are in an automatic lighting control mode (operation 508).

The example process 500 includes determining, for each of the plurality of exterior lights that are in the automatic lighting control mode based on the flying vehicle status, environmental status, and the current flight phase, a first subset of the exterior lights to command to a first lighting state and a second subset of the exterior lights to command to a second lighting state (operation 510). The first subset and second subset is further determined by applying a predefined lighting pattern based on the flying vehicle status, environmental status, and the current flight phase. Also, each of the first lighting state and the second lighting state is a different one of an on state, off state, strong intensity state, weak intensity state, or blinking state. The example process 500 further includes causing the first subset of exterior lights to be in the first lighting state and the second subset of exterior lights to be in the second lighting state (operation 512).

Actual implementation of the example automatic flying vehicle light system 102 may be by a dedicated module that interfaces with all relevant systems, or a specific software partition hosted in the public hardware platform with data through shared IO. In either case, the example automatic flying vehicle light system 102 is implemented by a computing system for controlling a plurality of exterior lights on the flying vehicle.

In one embodiment, a computing system for controlling a plurality of exterior lights on a flying vehicle is provided. The computing system is configured to: determine whether a flying vehicle status for the flying vehicle is a normal status, an emergency status, or another abnormal status; determine an environment status for the flying vehicle comprising a plurality of the proximity of surrounding traffic, time of day (e.g., daytime, nighttime, morning, evening, midnight, relation to sunrise or sunset, etc.), visibility, and weather; determine a current flight phase for the flying vehicle; identify a plurality of exterior lights on the flying vehicle that are in an automatic lighting control mode; determine, for each of the plurality of exterior lights that are in the automatic lighting control mode, a desired lighting state for the exterior light by applying a predefined lighting pattern that identifies, based on the flying vehicle status, environmental status, and the current flight phase, a first subset of the exterior lights to cause to enter a first lighting state and a second subset of the exterior lights to cause to enter a second lighting state, wherein each of the first lighting state and the second lighting state is a different one of an on state, off state, strong intensity state, weak intensity state, or blinking state; and cause the first subset of exterior lights to be in the first lighting state and the second subset of exterior lights to be in the second lighting state.

These aspects and other embodiments may include one or more of the following features. The computing system may be further configured to: identify a plurality of exterior lights on the flying vehicle that are in a manual lighting control mode; identify a third subset of the exterior lights that are in the manual lighting control mode to cause to be in a third lighting state, wherein the third lighting state is one of the on state, off state, strong intensity state, weak intensity state, or blinking state; and cause the third subset of exterior lights to be in the third lighting state. The third lighting state may be different from the first and second lighting state. The third lighting state may be the same as the first lighting state or the second lighting state. The computing system may be further configured to: identify, based on the flying vehicle status, environmental status, and the current flight phase, a fourth subset of the exterior lights that are in the automatic lighting control mode to cause to be in a fourth lighting state, wherein the fourth lighting state is one of the on state, off state, strong intensity state, weak intensity state, or blinking state, and wherein the fourth lighting state is different from the first and second lighting state; and cause the fourth subset of exterior lights to be in the fourth lighting state. The computing system may be further configured to control the plurality of exterior lights on the flying vehicle in each of the following flight phases: preflight, taxi-out, take off, en-route, approach, landing, taxi-in, and complete.

In another embodiment, a processor-implemented method in a computing system in a flying vehicle for controlling a plurality of exterior lights on the flying vehicle is provided. The method comprises: determining, by a processor, whether a flying vehicle status for the flying vehicle is a normal status, an emergency status, or another abnormal status; determining, by the processor, an environment status for the flying vehicle comprising a plurality of the proximity of surrounding traffic, time of day (e.g., daytime, nighttime, morning, evening, midnight, relation to sunrise, sunset, etc.), visibility, and weather; determining, by the processor, a current flight phase for the flying vehicle; identifying, by the processor, a plurality of exterior lights on the flying vehicle that are in an automatic lighting control mode; determining, by the processor for each of the plurality of exterior lights that are in the automatic lighting control mode, a desired lighting state for the exterior light by applying a predefined lighting pattern that identifies, based on the flying vehicle status, environmental status, and the current flight phase, a first subset of the exterior lights to cause to be in a first lighting state and a second subset of the exterior lights to cause to be in a second lighting state, wherein each of the first lighting state and the second lighting state is a different one of an on state, off state, strong intensity state, weak intensity state, or blinking state; and causing, by the processor, the first subset of exterior lights to be in the first lighting state and the second subset of exterior lights to be in the second lighting state.

These aspects and other embodiments may include one or more of the following features. The method may further comprise: identifying, by the processor, a plurality of exterior lights on the flying vehicle that are in a manual lighting control mode; identifying, by the processor, a third subset of the exterior lights that are in the manual lighting control mode to cause to enter a third lighting state, wherein the third lighting state is one of the on state, off state, strong intensity state, weak intensity state, or blinking state; and causing, by the processor, the third subset of exterior lights to be in the third lighting state. The third lighting state may be different from the first and second lighting state. The third lighting state may be the same as the first lighting state or the second lighting state. The method may further comprise: identifying, based on the flying vehicle status, environmental status, and the current flight phase, a fourth subset of the exterior lights that are in the automatic lighting control mode to cause to be in a fourth lighting state, wherein the fourth lighting state is one of the on state, off state, strong intensity state, weak intensity state, or blinking state, and wherein the fourth lighting state is different from the first and second lighting state; and causing, by the processor, the fourth subset of exterior lights to be in the fourth lighting state. The method is operable in each of the following flight phases: preflight, taxi-out, take off, en-route, approach, landing, taxi-in, and complete.

In another embodiment, non-transitory computer readable media encoded with programming instructions that are configurable to cause a processor in avionics computing equipment on a flying vehicle to perform a method is provided. The method comprises: determining, by a processor, whether a flying vehicle status for the flying vehicle is a normal status, an emergency status, or another abnormal status; determining, by the processor, an environment status for the flying vehicle comprising a plurality of the proximity of surrounding traffic, time of day (e.g., daytime, nighttime, morning, evening, midnight, relation to sunrise, sunset, etc.), visibility, and weather; determining, by the processor, a current flight phase for the flying vehicle; identifying, by the processor, a plurality of exterior lights on the flying vehicle that are in an automatic lighting control mode; determining, by the processor for each of the plurality of exterior lights that are in the automatic lighting control mode, a desired lighting state for the exterior light by applying a predefined lighting pattern that identifies, based on the flying vehicle status, environmental status, and the current flight phase, a first subset of the exterior lights to cause to be in a first lighting state and a second subset of the exterior lights to cause to be in a second lighting state, wherein each of the first lighting state and the second lighting state is a different one of an on state, off state, strong intensity state, weak intensity state, or blinking state; and causing, by the processor, the first subset of exterior lights to be in the first lighting state and the second subset of exterior lights to be in the second lighting state.

These aspects and other embodiments may include one or more of the following features. The method may further comprise: identifying, by the processor, a plurality of exterior lights on the flying vehicle that are in a manual lighting control mode; identifying, by the processor, a third subset of the exterior lights that are in the manual lighting control mode to cause to enter a third lighting state, wherein the third lighting state is one of the on state, off state, strong intensity state, weak intensity state, or blinking state; and causing, by the processor, the third subset of exterior lights to be in the third lighting state. The third lighting state may be different from the first and second lighting state. The third lighting state may be the same as the first lighting state or the second lighting state. The method may further comprise: identifying, based on the flying vehicle status, environmental status, and the current flight phase, a fourth subset of the exterior lights that are in the automatic lighting control mode to cause to be in a fourth lighting state, wherein the fourth lighting state is one of the on state, off state, strong intensity state, weak intensity state, or blinking state, and wherein the fourth lighting state is different from the first and second lighting state; and causing, by the processor, the fourth subset of exterior lights to be in the fourth lighting state. The method is operable in each of the following flight phases: preflight, taxi-out, take off, en-route, approach, landing, taxi-in, and complete.

In another embodiment, a processor-implemented method in a computing system in a flying vehicle for controlling a plurality of exterior lights on the flying vehicle is provided. The method comprises: determining, by a processor, the flying vehicle status, including determining whether the flying vehicle status has a normal status, an emergency status, or some other abnormal status; determining, by the processor, an environmental status of the flying vehicle environment, wherein the environmental status includes a plurality of the proximity of surrounding traffic, time of day (e.g., daytime, nighttime, morning, evening, midnight, relation to sunrise or sunset), visibility, and weather; determining, by the processor, a current flying vehicle flight phase; identifying, by the processor, a current lighting control mode for each of the plurality of exterior lights on the flying vehicle by determining for each exterior light whether the current lighting control mode is a manual lighting control mode or an automatic lighting control mode; determining, by the processor for all exterior lights in a manual control mode, a first subset of exterior lights that have been commanded to be in a first state and/or a second subset of exterior lights that have been commanded to be in a second state; determining, by the processor, the lighting status for all exterior lights in an automatic lighting control mode by applying a predefined lighting pattern that identifies, based on the flying vehicle status, environmental status, and flight phase, a third subset of the exterior lights to be in the first state and/or a fourth subset of the exterior lights to be in the second state; and causing, by the processor, the first subset of exterior lights and the third subset of exterior lights to be in a first state and causing, by the processor, the second subset of exterior lights and the fourth subset of exterior lights to be in a second state; wherein each of the first state and the second state is one of an on state, off state, strong intensity state, weak intensity state, or blinking state.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computing system for controlling a plurality of exterior lights on a flying vehicle, the computing system configured to:
    determine whether a flying vehicle status for the flying vehicle is a normal status, an emergency status, or another abnormal status;
    determine an environment status for the flying vehicle comprising a plurality of the proximity of surrounding traffic, time of day, visibility, and weather;
    identify a plurality of exterior lights on the flying vehicle that are in an automatic lighting control mode; and
    for a current flight phase:
        automatically cause the plurality of exterior lights to illuminate in accordance with a first predefined lighting pattern when the flying vehicle status is a normal status and the environment status is in a first state;
        automatically cause the plurality of exterior lights to illuminate in accordance with a second predefined lighting pattern when the flying vehicle status is a normal status and the environment status is in a second state; and
        automatically cause the plurality of exterior lights to illuminate in accordance with a third predefined lighting pattern when the flying vehicle status is an abnormal or emergency status, wherein the first, second, and third predefined lighting patterns are different.

2. The computing system of claim 1, wherein each exterior light of the plurality of exterior lights for each of the predefined lighting patterns is in one of an on state, off state, strong intensity state, weak intensity state, or blinking state.

3. The computing system of claim 1, further configured to generate a lighting command to automatically cause the plurality of exterior lights to illuminate in accordance with the first, second, or third predefined lighting pattern, and wherein the lighting command is determined based on:
    the flight phase and a particular environment status out of a plurality of pre-defined environment statuses when in a normal control mode, and
    a particular pre-defined emergency status out of a plurality of pre-defined emergency statuses when in an emergency control mode.

4. The computing system of claim 1, further configured to:
    identify a plurality of exterior lights on the flying vehicle that are in a manual lighting control mode; and cause the plurality of exterior lights in the manual lighting control mode to illuminate in accordance with received manual lighting commands.

5. The computing system of claim 1, further configured to:
receive a manual lighting command; and
override an active predefined lighting pattern when complying with the manual lighting command.

6. The computing system of claim 1, further configured to:
receive a manual override command to change control of the plurality of exterior lights on the flying vehicle that are in an automatic lighting control mode from the automatic lighting control mode to a manual lighting control mode; and
receive a manual revert to Auto command to change control from the manual lighting control mode to the automatic lighting control mode.

7. The computing system of claim 1, further configured to control the plurality of exterior lights on the flying vehicle in each of the following flight phases: preflight, taxi-out, take off, en-route, approach, landing, taxi-in, and complete.

8. A processor-implemented method in a computing system in a flying vehicle for controlling a plurality of exterior lights on the flying vehicle, the method comprising:
determining, by a processor, whether a flying vehicle status for the flying vehicle is a normal status, an emergency status, or another abnormal status;
determining, by the processor, an environment status for the flying vehicle comprising a plurality of the proximity of surrounding traffic, time of day, visibility, and weather;
identifying, by the processor, a plurality of exterior lights on the flying vehicle that are in an automatic lighting control mode; and
for a current flight phase:
automatically illuminating the plurality of exterior lights in accordance with a first predefined lighting pattern when the flying vehicle status is a normal status and the environment status is in a first state;
automatically illuminating the plurality of exterior lights in accordance with a second predefined lighting pattern when the flying vehicle status is a normal status and the environment status is in a second state; and
automatically illuminating the plurality of exterior lights in accordance with a third predefined lighting pattern when the flying vehicle status is an abnormal or emergency status, wherein the first, second, and third predefined lighting patterns are different.

9. The method of claim 8, wherein each exterior light of the plurality of exterior lights for each of the predefined lighting patterns is in one of an on state, off state, strong intensity state, weak intensity state, or blinking state.

10. The method of claim 8, further comprising generating a lighting command to automatically cause the plurality of exterior lights to illuminate in accordance with the first, second, or third predefined lighting pattern, and wherein the lighting command is determined based on:
the flight phase and a particular environment status out of a plurality of pre-defined environment statuses when in a normal control mode, and
a particular pre-defined emergency status out of a plurality of pre-defined emergency statuses when in an emergency control mode.

11. The method of claim 8, further comprising:
identifying a plurality of exterior lights on the flying vehicle that are in a manual lighting control mode; and causing the plurality of exterior lights in the manual lighting control mode to illuminate in accordance with received manual lighting commands.

12. The method of claim 8, further comprising:
receiving a manual lighting command; and
overriding an active predefined lighting pattern when complying with the manual lighting command.

13. The method of claim 8, further comprising:
receiving a manual override command to change control of the plurality of exterior lights on the flying vehicle that are in an automatic lighting control mode from the automatic lighting control mode to a manual lighting control mode; and
receiving a manual revert to Auto command to change control from the manual lighting control mode to the automatic lighting control mode.

14. The method of claim 8, wherein the method is operable in each of the following flight phases: preflight, taxi-out, take off, en-route, approach, landing, taxi-in, and complete.

15. Non-transitory computer readable media encoded with programming instructions that are configurable to cause a processor on avionics computing equipment on a flying vehicle to perform a method, the method comprising:
determining whether a flying vehicle status for the flying vehicle is a normal status, an emergency status, or another abnormal status;
determining an environment status for the flying vehicle comprising a plurality of the proximity of surrounding traffic, time of day, visibility, and weather;
identifying a plurality of exterior lights on the flying vehicle that are in an automatic lighting control mode; and
for a current flight phase:
automatically illuminating the plurality of exterior lights in accordance with a first predefined lighting pattern when the flying vehicle status is a normal status and the environment status is in a first state;
automatically illuminating the plurality of exterior lights in accordance with a second predefined lighting pattern when the flying vehicle status is a normal status and the environment status is in a second state; and
automatically illuminating the plurality of exterior lights in accordance with a third predefined lighting pattern when the flying vehicle status is an abnormal or emergency status, wherein the first, second, and third predefined lighting patterns are different.

16. The non-transitory computer readable media of claim 15, wherein each exterior light of the plurality of exterior lights for each of the predefined lighting patterns is in one of an on state, off state, strong intensity state, weak intensity state, or blinking state.

17. The non-transitory computer readable media of claim 15, wherein the method further comprises comprising generating a lighting command to automatically cause the plurality of exterior lights to illuminate in accordance with the first, second, or third predefined lighting pattern, and wherein the lighting command is determined based on:
the flight phase and a particular environment status out of a plurality of pre-defined environment statuses when in a normal control mode, and
a particular pre-defined emergency status out of a plurality of pre-defined emergency statuses when in an emergency control mode.

18. The non-transitory computer readable media of claim 15, wherein the method further comprises:

identifying a plurality of exterior lights on the flying vehicle that are in a manual lighting control mode; and causing the plurality of exterior lights in the manual lighting control mode to illuminate in accordance with received manual lighting commands.

19. The non-transitory computer readable media of claim 15, wherein the method further comprises:

receiving a manual lighting command; and overriding an active predefined lighting pattern when complying with the manual lighting command.

20. The non-transitory computer readable media of claim 19, wherein the method further comprises:

receiving a manual override command to change control of the plurality of exterior lights on the flying vehicle that are in an automatic lighting control mode from the automatic lighting control mode to a manual lighting control mode; and receiving a manual revert to Auto command to change control from the manual lighting control mode to the automatic lighting control mode.

\* \* \* \* \*